United States Patent [19]

Fujiyoshi et al.

[11] 4,230,904
[45] Oct. 28, 1980

[54] SIGNAL CONTROL CIRCUIT

[75] Inventors: Kazuyoshi Fujiyoshi; Kyoji Murakami, both of Fukuoka, Japan

[73] Assignee: Matsushita Electric Industrial Co., Ltd., Osaka, Japan

[21] Appl. No.: 972,368

[22] Filed: Dec. 22, 1978

[30] Foreign Application Priority Data

Dec. 27, 1977 [JP] Japan .................................. 52-157654

[51] Int. Cl.³ ............................................. H04M 1/60
[52] U.S. Cl. ................................................ 179/1 HF
[58] Field of Search ................ 179/1 HF, 170.2, 81 A

[56] References Cited

U.S. PATENT DOCUMENTS

| | | | |
|---|---|---|---|
| 3,787,621 | 1/1974 | Barok | 179/1 HF |
| 3,892,924 | 7/1975 | Vachon | 179/81 A |

*Primary Examiner*—Malcolm A. Morrison
*Assistant Examiner*—E. S. Kemeny
*Attorney, Agent, or Firm*—Spencer & Kaye

[57] ABSTRACT

An antisidetalk signal control circuit for preventing transmission of signals from a first source connected with a first input circuit to an output circuit while allowing the transmission of signals from a second source connected with a second input circuit to the output circuit. The signal control circuit comprises a first switching circuit having an input coupled to the first input circuit, a second switching circuit having an input coupled to the first output circuit through a phase inverter and a third switching circuit having an input coupled to the outputs of the first and second switching circuits. An oscillator drives the first switching circuit with signals having a given phase and the second and third switching circuits with signals of opposite phase. A low-pass filter couples the junction of the first and second switching circuits to the second input circuit and a feedback circuit couples the second input circuit to the junction of the first and second switching circuits. The reduction in sidetalk is not affected by variations in the impedances of the first and second signal sources.

3 Claims, 17 Drawing Figures

FIG. 4ℓ 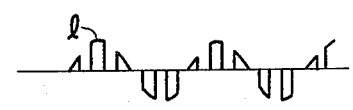
FIG. 5
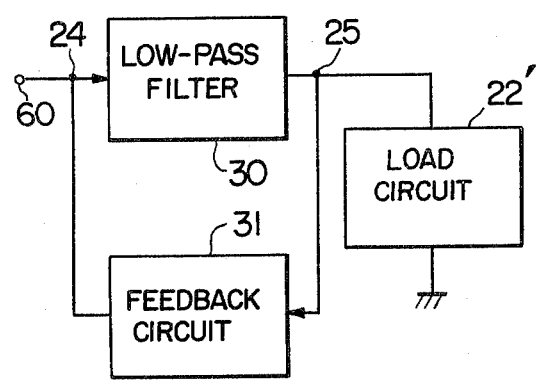
FIG. 6
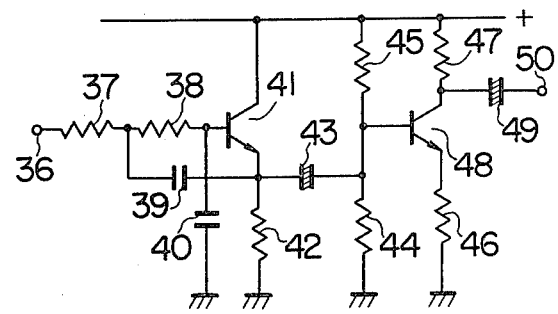

SIGNAL CONTROL CIRCUIT

BACKGROUND OF THE INVENTION

In the bidirectional telephone circuit or speakerphone (a telephone having a loudspeaker) which is now used most widely, it is necessary to use a device for suppressing only one of two coexisting signals to prevent sidetalk or sidetone. Here, "sidetalk or sidetone" is defined as a kind of acoustic feedback which is so weak that it does not cause howling.

Conventional signal control circuits for preventing sidetalk (that is, anti-sidetone circuits) have been designed to prevent sidetalk by balancing an impedance bridge as shown in FIG. 1, or alternatively, by utilizing a booster circuit employing an antisidetalk coil as shown in FIG. 2. In FIG. 1, numeral 1 designates a first signal source connected through a transformer 3 to the junction point of resistors 5 and 7 and to that of resistors 6 and 8. Numeral 2 designates a second signal source having an internal impedance Z and connected across the resistor 5 through a transformer 4. Assuming that the turn ratio of the transformer 4 is 1:1, if the ratio of the combined impedance of the resistance of the resistor 5 and the internal impedance Z of the second signal source 2 to the resistance of the resistor 6 is made equal to the ratio of the resistance of the resistor 7 to that of the resistor 8, then there appears no output signal of the first signal source 1 at an output terminal 9, but only an output signal of the second signal source 2 is delivered to the output terminal 9. However, if the internal impedance Z of the second signal source 2 varies, the bridge will be out of balance, thereby causing the output signal of the first signal source 1 to appear at the output terminal 9 and hence deteriorating its antisidetalk characteristic.

Referring now to FIG. 2, numeral 11 designates a first signal source, 12 a second signal source having an internal impedance Z, 16 output terminals, 17 a resistor, and 18 a coupling capacitor for blocking a d-c voltage, which elements are connected, as shown in FIG. 2, to windings 13, 14 and 15 wound on the same iron core. The appearance of an output signal of the first signal source 11 at the output terminals 16 may be prevented by cancelling a current flowing into the output terminals 16 with an electromotive force induced in the winding 15 and by making the ratio of the resistance of the resistor 17 to the internal impedance Z of the second signal source 12 take a constant value and by suitably selecting the number of turns of the windings 13, 14 and 15. However, also in this case, the balance will be lost by variations in the impedance Z with the resultant deterioration of its antisidetalk characteristic. Assuming now that in FIGS. 1 and 2 each of the signal sources 2 and 12 represents a wire telephone network, each of the signal sources 1 and 11 represents a wire telephone transmitter, and each of the output terminals 9 and 16 represents a receiver, it is necessary to prevent sidetalk from being caused by the appearance of a signal, which has been sent into the circuit by the signal sources 1 and 11, at the output terminals 9 and 16, respectively. With the conventional circuits as shown in FIGS. 1 and 2, it has been impossible to always surely prevent the occurrence of sidetalk, since the impedance of the wire telephone network varies depending on the manner of the connection of telephone circuits in the network.

SUMMARY OF THE INVENTION

It is the object of the present invention to prevent deterioration of the antisidetalk characteristic of a signal control circuit performing an antisidetalk operation, in which from the junction of two signal source circuits, which are adapted for use as a speaker telephone, etc. such as mentioned above, only one signal supplied from either one of the two signal source circuits can be taken out, said deterioration of the antisidetalk characteristic occurring when the one of the two signal source circuits has changed its impedance.

In the present invention, the signal control circuit comprises a first switching circuit having an input coupled to the first imput circuit, a second switching circuit having an input coupled to the first input circuit through a phase inverter and a third switching circuit having an input coupled to the outputs of the first and second switching circuits. An oscillator drives the first switching circuit with signals having a given phase and the second and third switching circuits with signals of opposite phase. A low-pass filter couples the junction of the first and second switching circuits to the second input circuit and a feedback circuit couples the second input circuit to the junction of the first and second switching circuits. The reduction in sidetalk is not affected by variations in the impedances of the first and second signal sources.

BRIEF DESCRIPTION OF THE DRAWING

FIG. 4a to 4l are wavefirm diagrams showing the waveforms appearing at various points in the block diagram of FIG. 3.

FIG. 5 is a block diagram showing the essential portions of the signal control circuit according to the present invention.

FIG. 6 is a wiring diagram showing the specific construction of the low-pass filter used in the present invention.

DESCRIPTION OF THE PREFERRED EMBODIMENTS

The present invention will now be described with reference to the illustrated embodiments.

Figure 1:
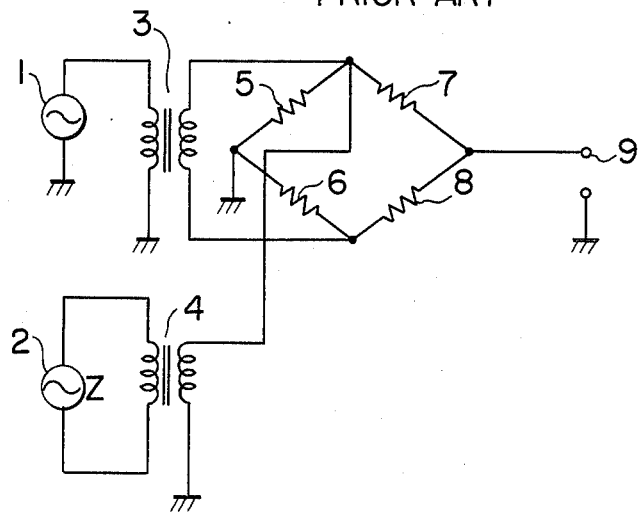
FIGS. 1 and 2 are circuit diagrams showing prior art circuits, respectively.
Figure 2:
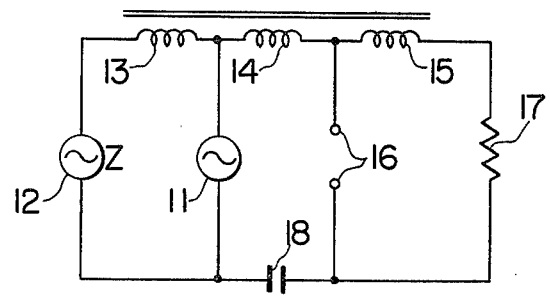
Figure 3:
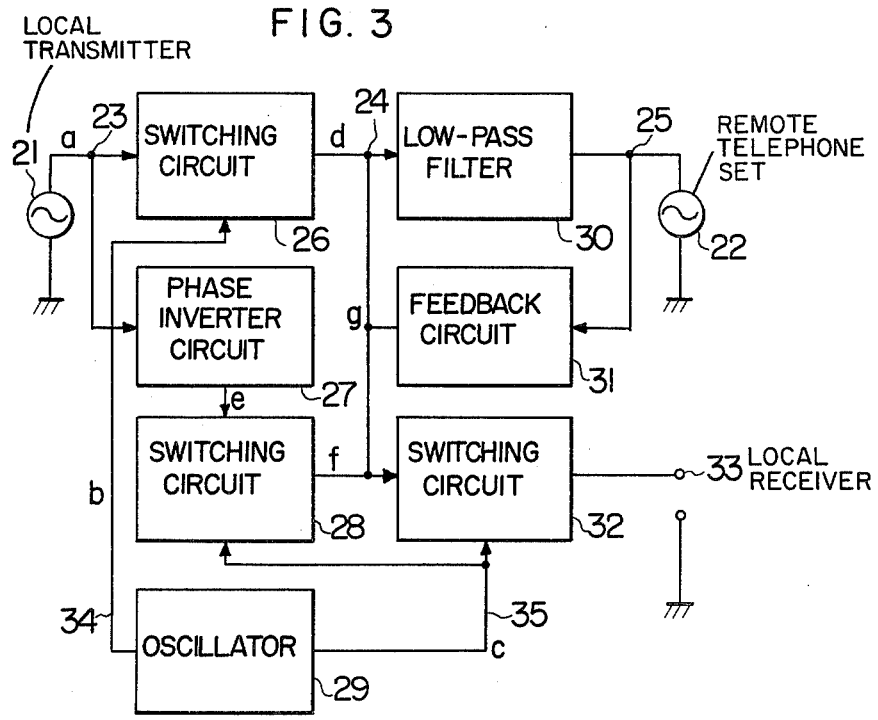
FIG. 3 is a block diagram showing an embodiment of the present invention.

Referring to FIG. 3 showing the construction of a signal control circuit embodying the present invention, numeral 21 designates a first signal source, and 22 a second signal source. Numerals 26, 28 and 32 designate switching circuits which are driven respectively by the signals on output lines 34 and 35 of an oscillator 29. Numeral 27 designates a phase inverter circuit, 30 a low-pass filter whose circuit itself does not possess a function of feeding its output signal back to its input, 31 a circuit for positively feeding back the signal at a junction point 25 to a junction point 24, namely, the signal at the junction point 25 being fed back to be in phase with the signal at the junction point 24, and 33 an output terminal.

Applying this embodiment to a telephone amplifier system, the first signal source 21 corresponds to a local transmitter or microphone and the output terminal 33 is led to a local receiver comprising a speaker coupled to terminal 33 through an amplifier. The path between the junction point 25 and the second signal source 22 corresponds to a telephone circuit, and the second signal source 22 corresponds to a remote telephone set connected through a switchboard.

FIGS. 4a to 4l show signal waveforms appearing at various points in the block diagram of FIG. 3. In FIG. 3, symbol a designates the waveform of a signal from the first signal source 21, b the waveform at the output 34 of the oscillator 29, c the waveform at the output 35 of the oscillator 29 which is in opposite phase to that at the output 34, d the waveform of an output signal of the switching circuit 26 driven by the waveform b, namely, the waveform at the output 34 of the oscillator 29, e the waveform of an output signal of the phase inverter circuit 27 whose input is connected to a junction point 23 between the signal source 21 and the switching circuit 26, and f the waveform of an output signal of the switching circuit 28 which receives the waveform e from the phase inverter circuit 27 and is driven by the waveform c, namely, the waveform at the output 35 of the oscillator 29.

The signals d and f are combined at the junction point 24. However, now let us take only the signal d into consideration. Since the signal d is led through the low-pass filter 30 and the junction point 25 to the second signal source 22 and the positive feedback circuit 31 is connected between the junction points 25 and 24, the signal at the junction point 24 will have a waveform obtained by the addition of hatched portions to the signal d, as shown at g. Assuming that the output signal f of the switching circuit 28 is suitably adjusted to have the waveform h, the resultant waveform at the junction point 24 becomes as shown at i. The signal i is delivered to the output terminal 33 through the switching circuit 32. Since the switching circuit 32 is driven by the output signal c of the oscillator 29, thereby being synchronized with the switching operation of the switching circuit 28, the ouput signal of the switching circuit 32 becomes zero. Hence, it results that, when the signal a from the signal source 21 is transmitted to the signal source 22, it is possible to prevent the occurrence of sidetalk completely. Here, even when the internal impedance of the signal source 22 varies, both signals g and f increase or decrease in the same direction at the same time, thereby operating to surely reduce sidetalk toward zero. Therefore, a stable antisidetalk effect is always ensured irrespective of variations in the internal impedance of the signal source 22.

In FIG. 5, numerals 24, 25, 30 and 31 correspond to their counterparts in FIG. 3 and numeral 22′ corresponds to its counterpart 22 in FIG. 3. It is assumed that the circuit of the low-pass filter 30 has a voltage amplification factor A for signals having the frequencies in the pass band, the positive feedback circuit 31 has a voltage amplification factor $\beta$ and applies the signal at the junction point 25 to the junction point 24 to be in phase with the signal at the junction point 24, and the signal source 22′ is a load circuit having an impedance Z. Further, assuming that the output of the low-pass filter 30 is used for constant-current driving of the load circuit, the voltage amplification factor A becomes a function of the load impedance Z. Now, letting $\alpha = f(Z)$, and assuming that, when $\alpha$ is unity, the relation $A = \beta = K$, $K < 1$ holds, A and $\beta$ may be expressed as follows:

$$A = K \cdot \alpha, \quad \beta = K$$

Now, if a voltage signal of the voltage value $V_1$ is applied to an imput terminal 60 in FIG. 5, the resultant voltage at the junction point 24 is given by $$(1 + \frac{K^2 \cdot \alpha}{1 - K^2 \cdot \alpha}) \cdot V_1$$

and the resultant voltage at the junction point 25 is given by $$\frac{K \cdot \alpha}{1 - K^2 \cdot \alpha} \cdot V_1$$

Figure 4A:
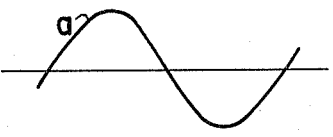
Figure 4B:
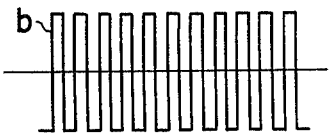
Figure 4C:
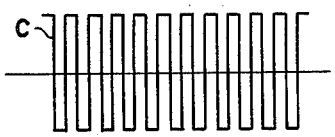
Figure 4D:
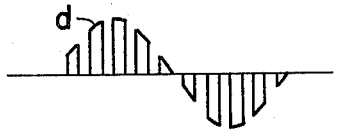
Figure 4E:
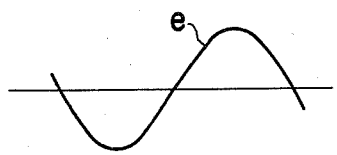
Figure 4F:
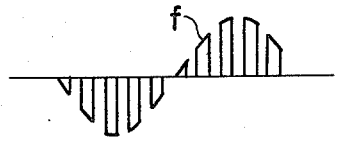
Figure 4G:
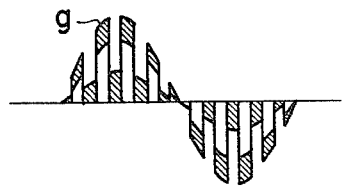

In the above-given voltage at the junction point 24, the term $$\frac{K^2 \cdot \alpha}{1 - K^2 \cdot \alpha} \cdot V_1$$

corresponds to the added hatched portions in the waveform g in FIG. 4g, and the above-given voltage at the junction point 25 corresponds to the voltage supplied to the load circuit 22′ in FIG. 5.

Figure 4H:
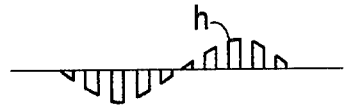

If a signal of the voltage value $V_2$ corresponding to the waveform h in FIG. 4h is applied to the input terminal 60 in FIG. 5 in addition to the signal $V_1$, then the resultant voltage at the junction point 24 is given by $$(1 + \frac{K^2 \cdot \alpha}{1 - K^2 \cdot \alpha}) \cdot V_1 + (1 + \frac{K^2 \cdot \alpha}{1 - K^2 \cdot \alpha}) \cdot V_2$$

Here, letting the sidetalk component be completely cancelled to become zero, we obtain $$\frac{K^2 \cdot \alpha}{1 - K^2 \cdot \alpha} \cdot V_1 + (1 + \frac{K^2 \cdot \alpha}{1 - K^2 \cdot \alpha}) \cdot V_2 = 0 \text{ or}$$

$$\frac{K^2 \cdot \alpha}{1 - K^2 \cdot \alpha} \cdot V_1 + \frac{1}{1 - K^2 \cdot \alpha} \cdot V_2 = 0$$

Figure 4I:
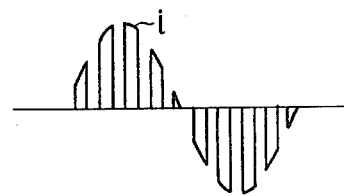

It results that, when $V_2 = -K^2 \cdot \alpha \cdot V_1$, the sidetalk component is cancelled and becomes zero, leaving only the signal component of the waveform i in FIG. 4i. Let $\alpha_1$ be a value of $\alpha$ which satisfies $V_2 = -K^2 \cdot \alpha \cdot V_1$.

Now, the amount of an uncancelled sidetalk component is calculated when $\alpha$ varies in the range between $\frac{1}{2}\alpha_1$ and $2\alpha_1$.

The variation of $\alpha$ from $\alpha_1$ to $\frac{1}{2}\alpha_1$ gives the amount of a sidetalk signal by $$\frac{K^2 \cdot \frac{1}{2}\alpha_1}{1 - K^2 \cdot \frac{1}{2}\alpha_1} \cdot V_1 + \frac{-K^2 \cdot \alpha_1}{1 - K^2 \cdot \frac{1}{2}\alpha_1} \cdot V_1 =$$

$$\frac{1}{2}(\frac{-K_2 \cdot \alpha_1}{1 - K^2 \cdot \frac{1}{2}\alpha_1}) \cdot V_1$$

and the variation of $\alpha$ from $\alpha_1$ to $2\alpha_1$ gives the amount of a sidetalk signal by $$\frac{2K^2 \cdot \alpha_1}{1 - 2K^2 \cdot \alpha_1} \cdot V_1 + \frac{-K^2 \cdot \alpha_1}{1 - 2K^2 \cdot \alpha_1} \cdot V_1 = \frac{K^2 \cdot \alpha_1}{1 - 2K^2 \cdot \alpha_1} \cdot V_1$$

The second term on the left side of each of the above two equations corresponds to the sidetalk component cancelling signal, and the right side term thereof represents the uncancelled residual sidetalk component.

Thus, it is seen that in accordance with the present invention the sidetalk component cancelling signal comprises a multiplication factor of $$\frac{1}{1 - K^2 \cdot \alpha},$$

so that in the range of $K^2 \cdot \alpha < 1$ the sidetalk component cancelling signal varies in the same direction with variations of the sidetalk signal due to variations of the load impedance, namely, variations of $\alpha$.

Further, the calculation of the amount of sidetalk when using a fixed sidetalk component cancelling signal as in the case of the prior art circuit may be conducted in by letting the second term, which represents the sidetalk component cancelling signal, on the left side of the equation described before and recited below be constant with $\alpha$ in the second term being fixed at a specified value $\alpha_1$.

$$\frac{K^2 \cdot \alpha}{1 - K^2 \cdot \alpha} \cdot V_1 + \frac{1}{1 - K^2 \cdot \alpha_1} \cdot V_2 \text{ or}$$

$$\frac{K^2 \cdot \alpha}{1 - K^2 \cdot \alpha} \cdot V_1 + \frac{- K^2 \cdot \alpha_1}{1 - K^2 \cdot \alpha_1} \cdot V_1$$

Here, the variation of $\alpha$ from $\alpha_1$ to $\frac{1}{2} \cdot \alpha_1$ gives the amount of a sidetalk signal by $$\frac{K^2 \cdot \frac{1}{2}\alpha_1}{1 - K^2 \cdot \frac{1}{2}\alpha_1} \cdot V_1 + \frac{- K^2 \cdot \alpha_1}{1 - K^2 \cdot \alpha_1} \cdot V_1$$

and the variation of $\alpha$ from $\alpha_1$ to $2\alpha_1$ gives the amount of a sidetalk signal by $$\frac{2K^2 \cdot \alpha_1}{1 - 2K^2 \cdot \alpha_1} \cdot V_1 + \frac{- K^2 \cdot \alpha_1}{1 - K^2 \cdot \alpha_1} \cdot V_1$$

The calculation by substituting numerical values in the expressions will show that the sidetalk component cancellation according to the present invention brings an improvement of about 4 dB.

In the embodiment described above there has been employed a positive feedback circuit for the circuit 31. However, the positive feedback circuit 31 may be replaced by a negative feedback circuit designed so that a signal at the junction point 25 is negatively fed back to the junction point 24 to be in opposite phase to the signal at the junction point 24. In this case the resultant voltage at the junction point 24 is given by $$(1 - \frac{K^2 \cdot \alpha}{1 + K^2 \cdot \alpha}) \cdot V_1$$

and the voltage at the junction point 25 is given by $$\frac{K \cdot \alpha}{1 + K^2 \cdot \alpha} \cdot V_1$$

If a sidetalk cancellation voltage $V_2$ is added to the signal at the junction point 24, the resultant voltage at the junction point 24 becomes as shown below:

$$(1 - \frac{K^2 \cdot \alpha}{1 + K^2 \cdot \alpha}) \cdot V_1 + (1 - \frac{K^2 \cdot \alpha}{1 + K^2 \cdot \alpha}) \cdot V_2$$

Letting $$\frac{- K^2 \cdot \alpha}{1 + K^2 \cdot \alpha} \cdot V_1 + \frac{1}{1 + K^2 \cdot \alpha} \cdot V_2 = 0 \text{ or}$$

$$\frac{K^2 \cdot \alpha}{1 + K^2 \cdot \alpha} \cdot V_1 - \frac{1}{1 + K^2 \cdot \alpha} \cdot V_2 = 0$$

then, we obtain $$V_2 = K^2 \cdot \alpha \cdot V_1$$

Thus, a result similar to the former case is reached. In this case, however, it will be seen that the sidetalk component cancelling signal has a multiplication factor of $$\frac{1}{1 + K^2 \cdot \alpha},$$

so that the sidetalk component cancelling signal varies in a direction opposite to that of variations of the sidetalk signal due to variations of the load impedance, namely, variations of $\alpha$. Assuming that the circuit of the low-pass filter 30 has a positive feedback function whereby its output signal is positively fed back to its input, that the quantity B of the positive feedback is greater than the quantity of the negative feedback to the junction point 24 through the negative feedback circuit 31, and that the quantity B of the positive feedback through the low-pass filter 30 does not vary with variations of $\alpha$, the change of the level of the sidetalk component due to variations of $\alpha$ is given by $$B - \frac{K^2 \cdot \alpha}{1 + K^2 \cdot \alpha} \cdot V_1, \text{ where } B > 0$$

Thus, it is seen that the level of the sidetalk component varies in the same direction with that of variations of the multiplication factor $$\frac{1}{1 + K^2 \cdot \alpha}$$

of $V_2$ in the sidetalk component cancelling signal term, when $\alpha$ varies.

FIG. 6 shows an exemplifying embodiment of the low-pass filter 30, in which positive feedback is effected to an input terminal 36 through a capacitor 39.

The quantity of the positive feedback is not affected by variations in a load connected to a terminal 50 because of the provision of a buffer amplifier between the input terminal 36 and the output terminal 50. It will thus be seen that the use of a negative feedback circuit for the feedback circuit 31 in FIG. 5 may also give the same antisidetalk effect as that obtained by the use of the positive feedback circuit as described above.

Figure 4J:
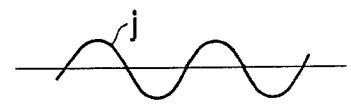
Figure 4K:
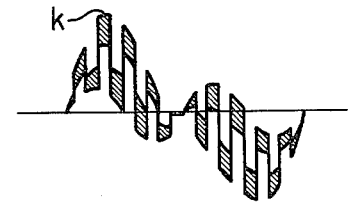

Assuming that a signal from the signal source 22 in FIG. 3 has the waveform j shown in FIG. 4j, the resultant waveform at the junction point 24 has a combined waveform, as shown at k in FIG. 4k, of the waveform g having its hatched portions modulated and the waveform h. The combined waveform is led through the switching circuit 32, thereby producing the waveform l shown in FIG. 4*l* at the output terminal 33. This waveform comprises only the signal component corresponding to the signal from the signal source 22. Consequently, by taking out the waveform 1 from the output terminal 33 and letting it pass through a suitable low-pass filter it is possible to obtain only the signal from the signal source 22.

It will thus be seen from the foregoing that by using the signal control circuit of the present invention it is possible to obtain an extremely stable antisidetalk effect for a two-wire bidirectional communication circuit, and besides the signal control circuit of this invention can provide remarkably effective means for a speakerphone, a hands-free interphone, etc. in which electrical and acoustic coupling between a first signal source and an output terminal is unavoidable

We claim:

1. A signal control circuit comprising:
   first input means connected to a first signal source circuit;
   second input means connected to a second signal source circuit;
   output means;
   an oscillator having first and second outputs for generating first and second output signals, respectively, said second output signal being in opposite phase with respect to said first output signal;
   a first switching circuit having inputs thereto connected respectively to said first input to said signal control circuit to and said first output of said oscillator, said first switching circuit being driven by said first output signal from said oscillator to provide a first switched output signal at an output thereof;
   a second switching circuit having inputs thereto connected respectively to said first input to said signal control circuit through a phase inverter circuit and to said second output of said oscillator, said second switching circuit being driven by said second output signal from said oscillator to provide a second switched output signal at an output thereof;
   a low-pass filter having an input thereto connected to a junction point of the outputs of said first and second switching circuits, the output of said low-pass filter being connected to said second input of said signal control circuit;
   a feedback circuit having an input thereto connected to said second input of said signal control circuit and an output thereof connected to said junction point of the outputs of said first and second switching circuits; and
   a third switching circuit having inputs thereto connected respectively to said junction point of the outputs of said first and second switching circuits and to said second output of said oscillator, said third switching circuit having an output thereof connected to said output of said signal control circuit and driven by said second output signal from said oscillator to provide a third switched output signal at said output of said signal control circuit, said signal control circuit preventing transmission of signals from said first input means to said output means despite changes in the impedances of a signal source circuit.

2. A signal control circuit according to claim 1, wherein said feedback circuit provides a signal at the output thereof which is in opposite phase to the input signal thereto.

3. A signal control circuit according to claim 1, wherein said feedback circuit provides a signal at the output thereof which is in phase with the input signal thereto.

* * * * *